(12) United States Patent
Leder et al.

(10) Patent No.: US 7,096,541 B2
(45) Date of Patent: Aug. 29, 2006

(54) ARRANGEMENT ON A SPINNING PREPARATION MACHINE, IN PARTICULAR A CARD, WITH A MACHINE CASING

(75) Inventors: Armin Leder, Mönchengladbach (DE); Gerd Pferdmenges, Jüchen (DE)

(73) Assignee: Trützschler GmbH & Co. KG, Mönchengladbach (DE)

( * ) Notice: Subject to any disclaimer, the term of this patent is extended or adjusted under 35 U.S.C. 154(b) by 196 days.

(21) Appl. No.: 10/661,635

(22) Filed: Sep. 15, 2003

(65) Prior Publication Data

US 2004/0065046 A1     Apr. 8, 2004

(30) Foreign Application Priority Data

Sep. 16, 2002    (DE) .................. 102 42 929

(51) Int. Cl.
*D01G 15/00* (2006.01)

(52) U.S. Cl. ........................................... 19/98

(58) Field of Classification Search ............ 19/98, 19/99, 105, 106 R, 108, 65 A; 312/3, 109, 312/283, 351.1, 351.7; 49/142–145, 372–374, 49/463, 504, 505; 57/136
See application file for complete search history.

(56) References Cited

U.S. PATENT DOCUMENTS

| | | | | |
|---|---|---|---|---|
| 3,154,817 A | | 11/1964 | Muenz | |
| 4,091,507 A | * | 5/1978 | Sutter | 19/107 |
| 4,224,718 A | * | 9/1980 | Hicks | 19/107 |
| 4,258,453 A | * | 3/1981 | Jagst | 19/98 |
| 4,280,250 A | * | 7/1981 | Martin | 19/98 |
| 4,449,272 A | * | 5/1984 | Cash | 19/105 |
| 4,813,104 A | | 3/1989 | Hollingsworth et al. | |
| 5,290,077 A | * | 3/1994 | Fleming | 292/35 |
| 5,537,717 A | * | 7/1996 | Carey et al. | 19/98 |

FOREIGN PATENT DOCUMENTS

| | | |
|---|---|---|
| DE | 29 31 190 A1 | 2/1980 |
| DE | 35 05 875 A1 | 8/1986 |
| DE | 37 20 631 A1 | 1/1989 |
| GB | 792669 | 4/1958 |
| GB | 869308 (D1) | 5/1961 |

* cited by examiner

*Primary Examiner*—Gary L. Welch
(74) *Attorney, Agent, or Firm*—VENABLE LLP; Robert Kinberg; Ryan M. Plandro

(57) ABSTRACT

Machine supports are provided for a spinning preparation machine. A machine casing is arranged along the sides of the machine and includes casing elements attached to the supports. The casing elements are arranged to open up or close off openings in the machine casing so that free access is given to at least one side region and one end region of the machine.

32 Claims, 5 Drawing Sheets

ARRANGEMENT ON A SPINNING PREPARATION MACHINE, IN PARTICULAR A CARD, WITH A MACHINE CASING

CROSS-REFERENCE TO RELATED APPLICATION

This application claims the priority of German Application No. 102 42 929.4, filed on Sep. 16, 2002, the subject matter of which is incorporated herein by reference.

BACKGROUND OF THE INVENTION

The invention relates to a arrangement on a spinning preparation machine, in particular a card, provided with a machine casing arranged along the sides of the machine that consists of casing elements attached to support elements, wherein the casing elements can free and close off openings in the machine casing.

In practical operations, cards are enclosed with a casing made of sheet metal or other materials. This enclosure serves to protect the machine, to encapsulate it against spinning dust, to enhance the optical appearance and to safeguard against accidents.

U.S. Pat. No. 4,813,104 describes a housing frame of a known arrangement on a card with machine casing provided with wall elements that form a closed casing and include wall elements on the sides, as well as on the front and rear and a cover element. The housing frame includes four horizontal ground supports, four horizontal top supports and four vertical supports, which can consist of steel pipe. The known machine casing consists of supports and crossbeams, doors and flaps. The doors and flaps must be opened and dismantled for performing servicing and adjustment operations at the working members, wherein the dismantling involves unscrewing operations that frequently are very involved. The supports and crossbeams cannot be dismantled for static reasons, but considerably restrict the clearance space for performing the servicing operations. The possibility of access only separately and through the side areas and the output region of the machine is a particular disadvantage.

SUMMARY OF THE INVENTION

It is an object of the invention to provide an arrangement of the aforementioned type, which avoids these disadvantages, has a simple design and considerably improves, in particular enlarges, the clearance space necessary for performing work on the machine.

The above and other objects are accomplished according to the invention by the provision of an arrangement for a spinning preparation machine having machine sides, the arrangement comprising: machine supports for supporting the machine; and a machine casing arranged along the sides of the machine and including casing elements attached to the supports, the casing elements being arranged to open up or close off openings in the machine casing so that free access is given to at least one side region and one end region of the machine.

The measures according to the invention permit unhindered access to the machine. A cantilevered construction according to an exemplary embodiment eliminates crossbeams, supports and the like from the work area, thus resulting in a design where the machine is completely open and permits access from three sides. The machine sits, so-to-speak, unobstructed underneath a roof, thus making it possible to perform maintenance and servicing operations without problems. At the same time, the arrangement according to the invention makes it possible to open and/or close the casing in a structurally simple manner. The casing elements can be removed completely from the area of operation within a short time. Supports, crossbeams or the like do not exist in the area where work is to be performed.

BRIEF DESCRIPTION OF THE DRAWINGS

The invention is explained in further detail in the following, with the aid of exemplary embodiments shown in the accompanying drawings.

DETAILED DESCRIPTION OF THE INVENTION

Figure 1:
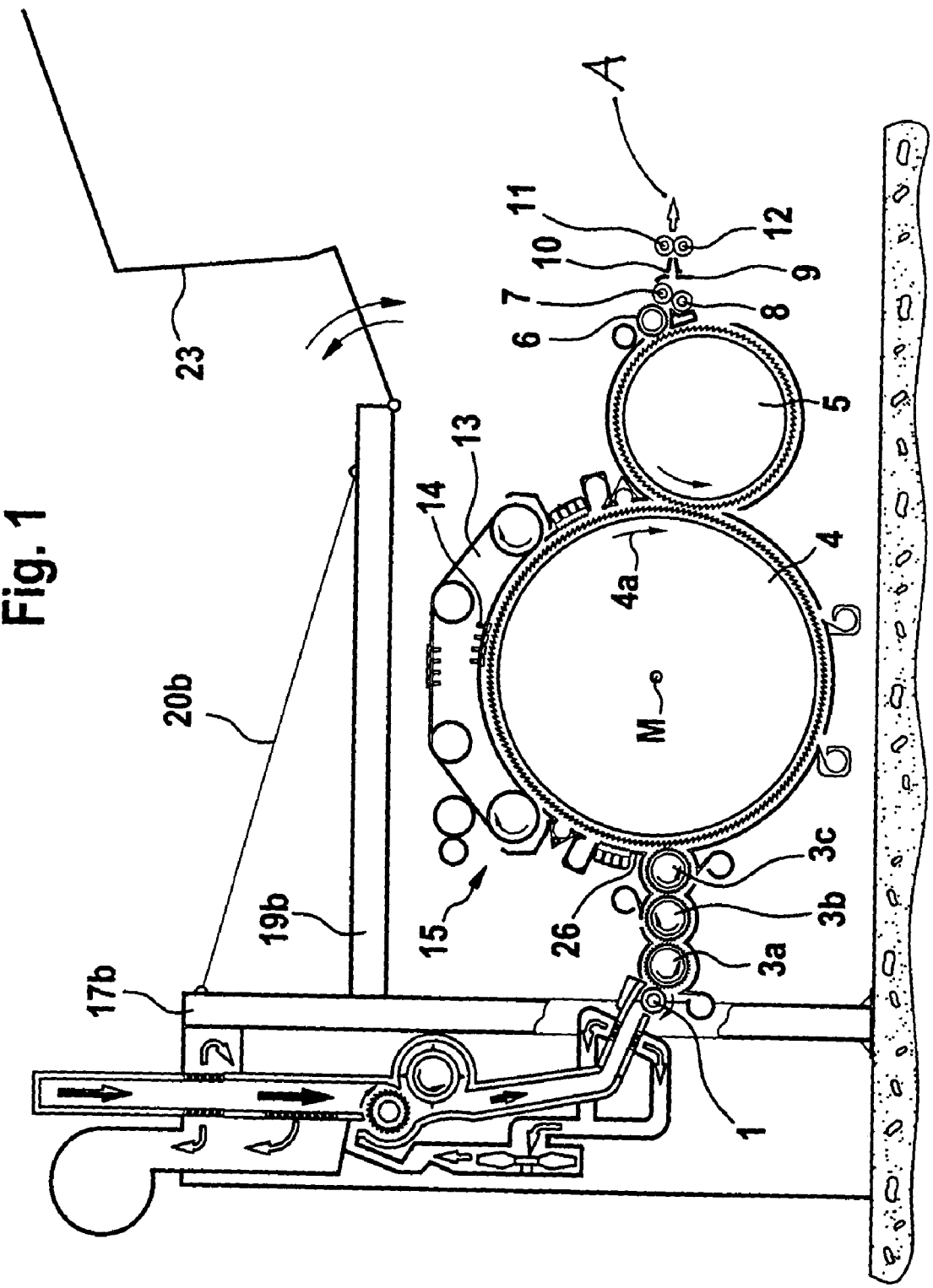
FIG. 1 is a schematic view from the side of a card with the arrangement according to an exemplary embodiment of the invention.

Referring to FIG. 1, there is shown a card 15, i.e. a high performance card DK 903 manufactured by Trützschler GmbH, Mönchengladbach, Germany, the common assignee of the present application, comprising a feed roller 1, licker-ins 3*a*, 3*b*, 3*c*, a main carding cylinder 4, doffers 5, a stripper roller 6, crushing rollers 7, 8, a sliver guide element 9, a web trumpet 10, withdrawing rollers 11, 12 and traveling flats 13 with flat bars 14. Curved arrows indicate the rotational direction of the rollers, wherein the machine has an operating direction denoted by A. A chute feed 16, for example a TRÜTZSCHLER Direktfeed DFK, is installed upstream of the card 15.

Figure 8A:
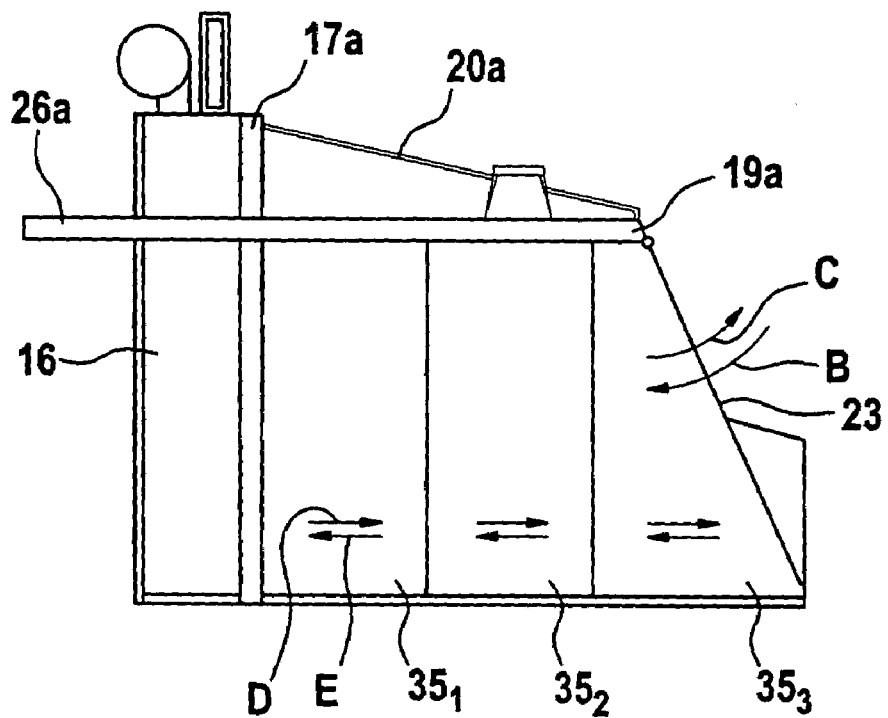
FIGS. 8*a*, 8*b* show a view from the side of the machine casing while it is closed (FIG. 8*a*) and while it is opened (FIG. 8*b*), respectively.
Figure 8B:
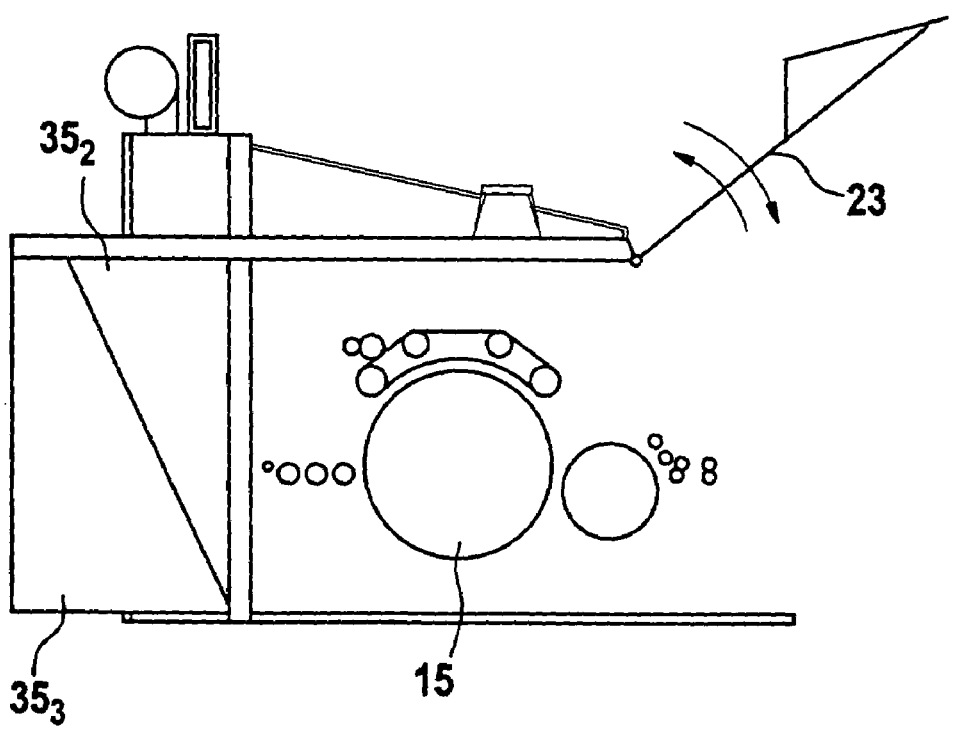

A machine casing for the card 15 consists of doors and flaps as casing elements, which are installed on supports and can open up or close off openings in the machine casing, as shown in FIGS. 8*b* and 8*a*, respectively, described in greater detail below.

Figure 2:
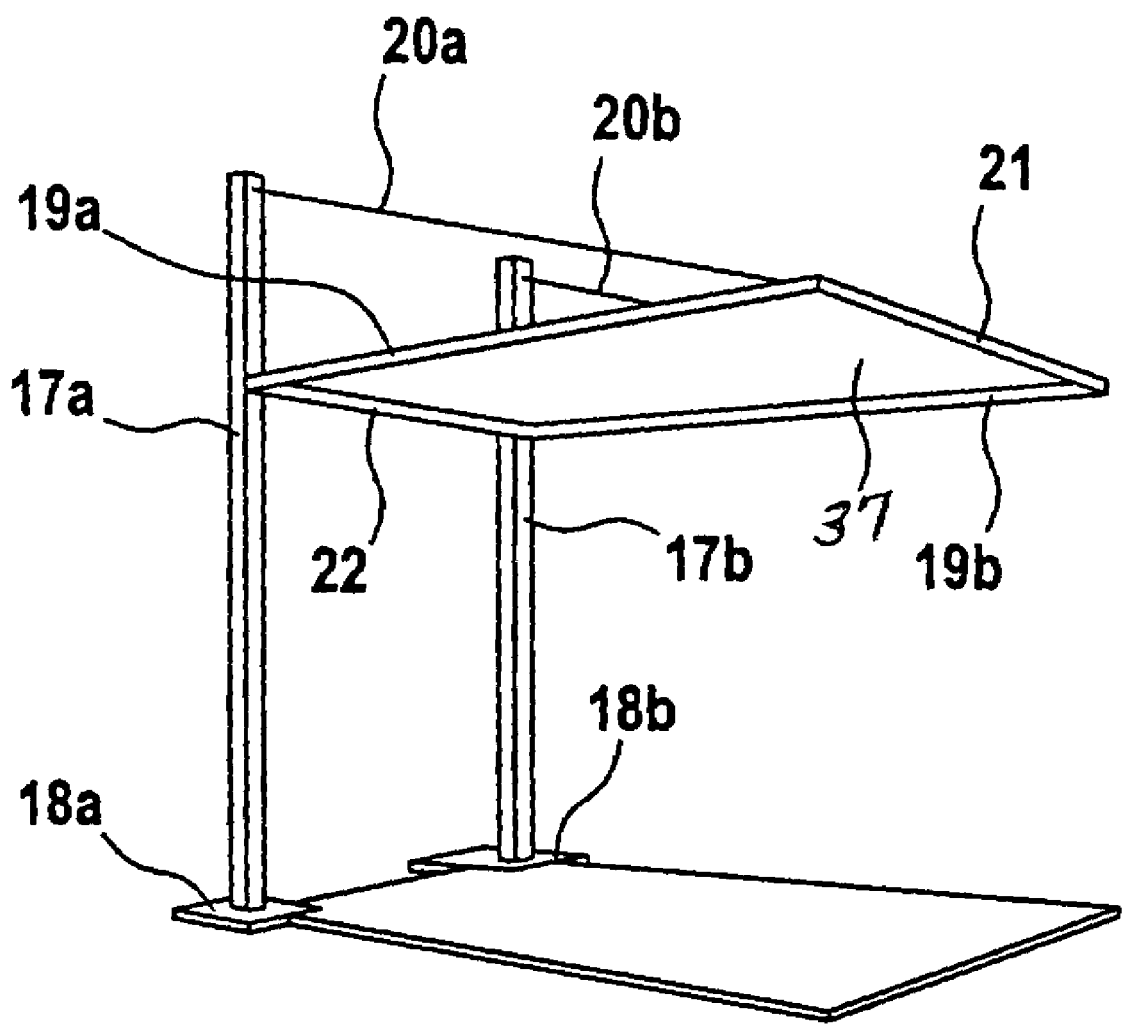
FIG. 2 is a perspective view of the supporting structure with supporting elements, holding elements and traction elements according to FIG. 1.

With reference to FIG. 2, the supports include two vertical supporting elements 17*a*, 17*b*, for example rectangular tubes, which rest with one end on the spinning plant floor and are advantageously attached thereto with the aid of base plates 18a, 18b. The supporting elements 17a, 17b, respectively arranged on the left and right side of the card, are designed as supports and are attached from the back to the card frame 15 (see FIG. 3), for example with screws. The supporting elements 17a, 17b are inherently rigid. An essentially horizontal holding element 19a and/or 19b is attached, for example, suspended from, each supporting element 17a, 17b that is respectively arranged on the left and right side of the card 15. The holding elements 19a, 19b are also inherently rigid and advantageously consist of square pipe. A traction mechanism, for example a rope 20a and/or 20b, prevents the holding elements 19a and 19b from tilting. The ropes 20a, 20b are attached with one end to the supporting element 17a and/or 17b and with the other end in the end region of the holding elements 19a and/or 19b and extend above the holding elements 19a and 19b. The holding elements 19a, 19b are advantageously connected in their end regions with an inherently rigid cross-connector 21. The supporting elements 17a, 17b are also connected to each other with an inherently rigid cross connector 22.

With the support structure for the machine casing as shown in FIG. 2, it is easy to see that unhindered access to the card 15, not shown in FIG. 2, is possible from two sides and from the front. No supports, crossbeams, etc. are disposed in the area where assembly and servicing operations are performed on the card 15.

Figure 3:
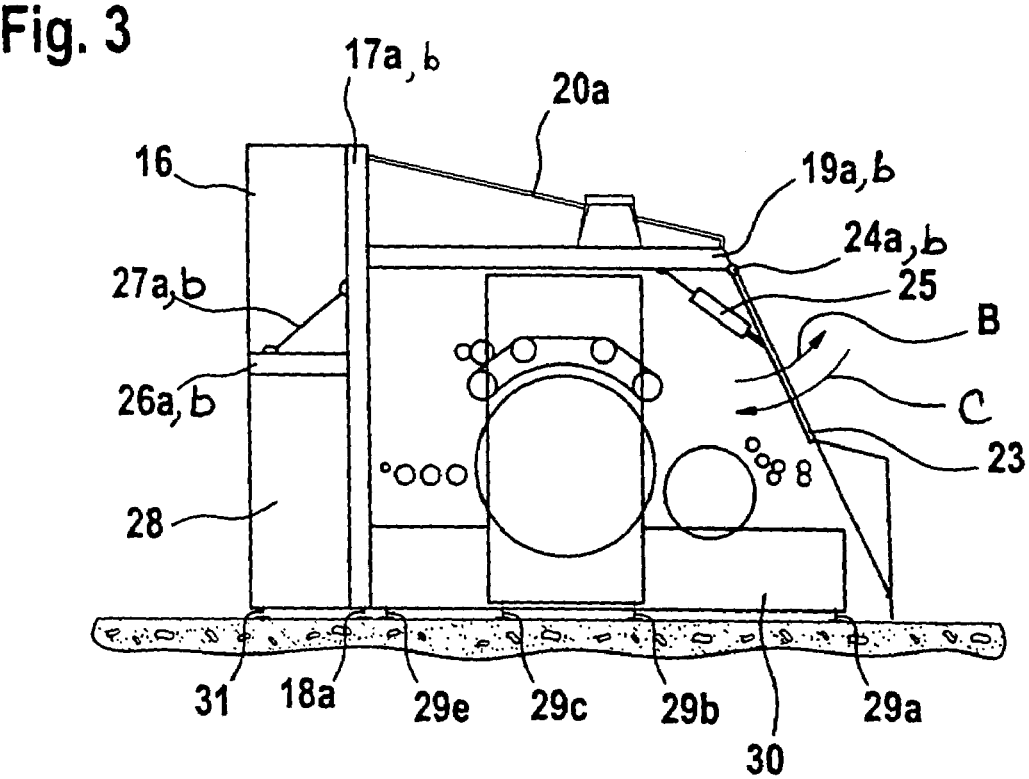
FIG. 3 shows an exemplary embodiment with spring-loaded covering flap and holding arms for fastening the chute feed.

FIG. 3 shows a cover flap 23, provided at the card 15 exit, and attached with hinges 24a, 24b to the ends of the holding elements 19a, 19b and can be pivoted in and pivoted out in the direction of arrows B, C. A fluid spring 25 is provided for positioning the cover flap 23, which is attached with one end to the holding element 19a and with the other end to the cover flap, such that it can pivot. On the rear side (entrance) facing away from the card 15, two horizontal holding arms 26a, 26b, for example made of square pipe, are attached to the supporting elements 17a and 17b, to which, and/or on which, a chute feed 16 is mounted. Traction ropes 27a, 27b are assigned to the holding arms 26a, 26b, respectively. The chute feed 16 is additionally attached to the support elements 17a and 17b, for example with screws. An electric switch cabinet 28 is also mounted on the supporting elements 17a, 17b. Machine frame 30 is provided with base plates 29a to 29e, and switch cabinet 28 is provided with base plates 31.

Figure 4:
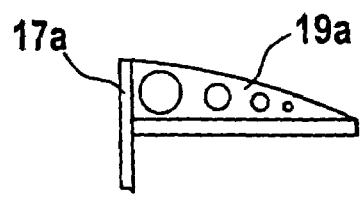
FIG. 4 shows a one-piece holding arm that is inherently stiff and diverts tension and bending forces according to another exemplary embodiment of the invention.

According to an exemplary embodiment shown in FIG. 4, the holding elements 19a, 19b and the traction element form a one-piece unit of an inherently rigid design. The holding elements 19a, 19b are shaped in the manner of a beam, for which the height decreases away from the supporting elements 17a, 17b in the direction A.

Figure 5:
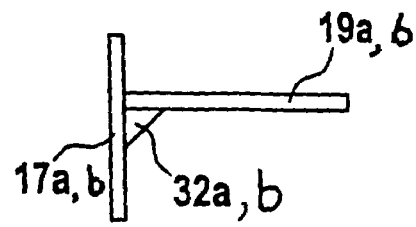
FIG. 5 shows an angle element, which diverts bending forces from the holding element according to another exemplary embodiment of the invention.

FIG. 5 shows an exemplary embodiment in which the holding element 19a, 19b can also be supported from below by a catch element 32a, 32b, for example a beam or angle element that is attached to the supporting elements 17a, 17b and diverts the bending forces from the holding elements 19a, 19b to the supporting elements 17a, 17b.

Figure 6:
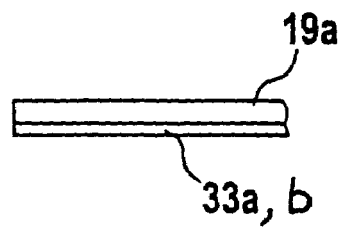
FIG. 6 shows a rail on the holding element according to another exemplary embodiment of the invention.

According to a further exemplary embodiment shown in FIG. 6, rails 33a, 33b are installed below the holding elements 19a, 19b, respectively, for displacing doors $35_1$ to $35_3$ (see FIG. 8a), cover elements or the like with the aid of rollers or the like. In an embodiment in which holding arms 26a, 26b are at the same height and are horizontally aligned with the holding elements 19a, 19b (see FIGS. 8a, 8b), rails 33a, 33b can be extended below the holding arms 26a, 26b for displacing casing elements covering chute 16.

Figure 7:
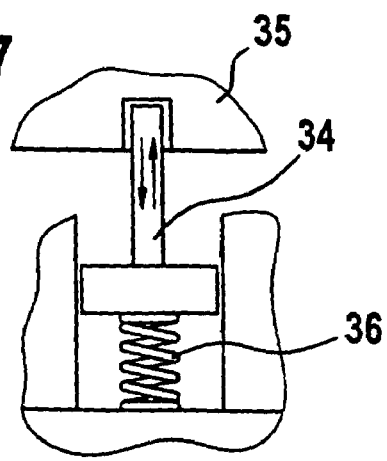
FIG. 7 is a schematic view of a stop bolt for the pivoting positioning of a door, so that the door can be released again in accordance with another exemplary embodiment of the invention.

The doors $35_1$ to $35_3$ (see FIG. 8a) are additionally provided with a fulcrum on the bottom of the machine frame 30. According to FIG. 7, these fulcrums are provided with latch bolts 34 and springs 36, which can be dismantled without tools. The doors $35_1$ to $35_3$ can thus be either completely cased in or removed.

FIG. 8a shows an exemplary embodiment in which the machine casing has three doors $35_1$, $35_2$, $35_3$ in one side region. Three additional doors corresponding to doors $35_1$, $35_2$, $35_3$ are provided in the opposite side region of card 15 (not shown herein). These doors can be displaced in the direction of arrows D, E. At the front (exit) exit side of card 15, the machine casing is provided with a pivoting cover flap 23 (FIGS. 8, 8b). A cover plate 37 is furthermore provided above the card 15, which is arranged according to FIG. 2 between the holding elements 17a, 17b and extends from the cross connector 21 to the crossmember 22. The space in which the card 15 is housed is delimited and/or covered at the rear (entrance) side of the card 15 by the chute feed 16. The doors $35_1$ to $35_3$ and corresponding doors on the opposite side of the machine are displaced along the rails 33a, 33b in the direction of arrow E until the side region of the card 15 is completely exposed and permits unhindered access to the card 15. As a result of the cantilevered construction of the supporting elements, the openings in the machine casing that can be closed off by casing elements such as doors, cover elements, flaps and the like can be exposed so as to allow free access to at least one side region and one front region of the card 15. The openings are closed off by displacing the doors $35_1$ to $35_3$ in the direction D and by pivoting the flap 23 in the direction B.

Figure 9A:
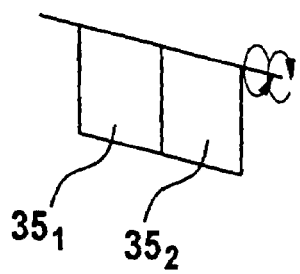
FIGS. 9*a*, 9*b* show doors in a side region of a spinning preparation machine that can be pivoted up and down according to another exemplary embodiment of the invention.
Figure 9B:
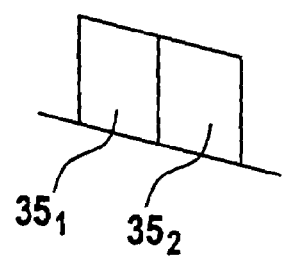

FIGS. 9a, 9b show an exemplary embodiment in which the doors $35_1$, $35_2$ can be pivoted around a horizontal axis in up and down direction, on pivot bearings (unnumbered) attached to the holding elements 19a, 19b.

Figure 10A:
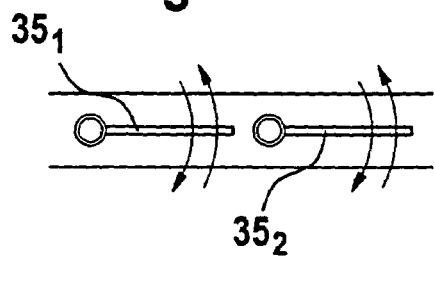
FIGS. 10*a*, 10*b* illustrate rotating doors and sliding doors in the side region of a spinning preparation machine according to a further exemplary embodiment of the invention.
Figure 10B:
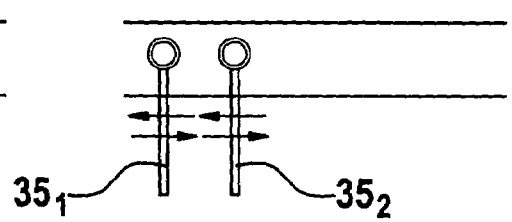

According to another exemplary embodiment shown in FIGS. 10a, 10b, the doors $35_1$, $35_2$ can be respectively pivoted and/or turned on pivot bearings (unnumbered) around a vertical axis and can then be subsequently displaced in a horizontal direction (arrows D, E in FIG. 8a) along rails 33a.

Figure 11A:
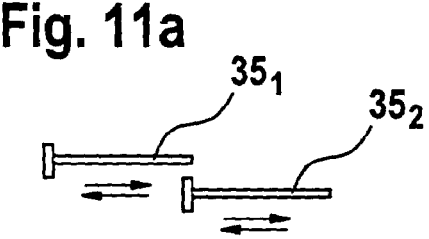
FIGS. 11*a*, 11*b* show a view from above of the displaceable doors in the side region according to FIGS. 8*a*, 8*b*.
Figure 11B:
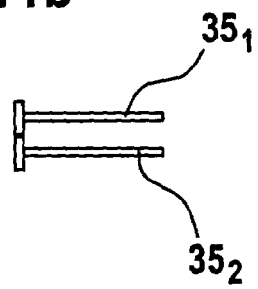

FIGS. 11a, 11b show a view from above of the displacement of doors $35_1$, $35_2$, as explained in FIGS. 8a, 8b.

Figure 12A:
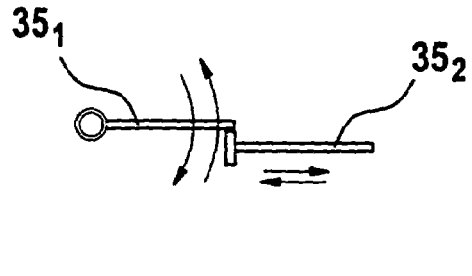
FIGS. 12*a*, 12*b* show a combination of rotating and sliding doors in the side region according to another exemplary embodiment of the invention.
Figure 12B:
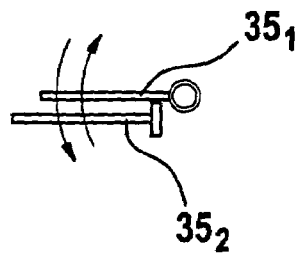

According to FIGS. 12a, 12b, the door $35_2$ can initially be displaced parallel to the door $35_1$, so that the doors $35_1$ and $35_2$ are arranged parallel to each other and one above the other. Finally, the doors $35_1$ and $35_2$ are jointly pivoted by 180° around a vertical axis. The door $35_2$ can be installed displaceable on the door $35_1$, i.e. with the aid of a rail.

The invention is explained with the example of the machine casing for a card. However, it can apply in the same way to the machine casing for other types of spinning machines, i.e. draw frames, combing machines, opening and cleaning machines and the like.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An arrangement for a spinning preparation machine having machine sides presenting at least one side region and one end region of the machine, the arrangement comprising:
    machine supports for supporting the machine; and
    a machine casing arranged along the sides of the machine and including casing elements attached to the supports, the casing elements being arranged to open up or close off openings in the machine casing so that free access is given to the at least one side region and the one end region of the machine.

2. The arrangement according to claim 1, wherein the supports comprise at least one vertical supporting element.

3. The arrangement according to claim 2, wherein the supports further include at least one horizontal holding element.

4. The arrangement according to claim 3, wherein the at least one horizontal holding element is suspended from the at least one vertical supporting element.

5. The arrangement according to claim 3, wherein the at least one horizontal holding element comprises a two-arm lever.

6. The arrangement according to claim 3, wherein the at least one horizontal holding element comprises a single-arm lever.

7. The arrangement according to claim 3, further comprising at least one traction element having one end which engages in the at least one horizontal holding element and another end which engages in the at least one vertical supporting element.

8. The arrangement according to claim 7, wherein the at least one traction element is one of a rod, pipe and a rope.

9. The arrangement according to claim 7, wherein the at least one traction element is arranged above the at least one horizontal holding element.

10. The arrangement according to claim 3, forming a combination with a spinning preparation machine, wherein the at least one horizontal holding element is arranged in an upper region of the machine.

11. The arrangement according to claim 10, wherein the at least one horizontal holding element is arranged above the machine.

12. The arrangement according to the claim 3, further comprising at least one additional horizontal holding element attached to the at least one vertical supporting element.

13. The arrangement according to claim 12, forming a combination with a spinning preparation machine comprising a card having a chute, and wherein the at least one additional horizontal holding element carries a chute feed for the card.

14. The arrangement according to claim 3, wherein the casing elements are attached to at least one of the at least one horizontal holding element and the at least one vertical supporting element.

15. The arrangement according to claim 14, wherein the casing elements are arranged to be at least one of rotatable and pivotable.

16. The arrangement according to claim 15, wherein the casing elements are rotatable or pivotable around at least one of a horizontal and vertical axis.

17. The arrangement according to claim 14, wherein the casing elements are displaceable in a horizontal direction.

18. The arrangement according to claim 17, further comprising rails attached to the at least one horizontal holding element.

19. The arrangement according to claim 2, forming a combination with a spinning preparation machine, wherein the at least one vertical supporting element is arranged in one of an intake area and a discharge area of the machine.

20. The arrangement according to claim 2, wherein the at least one vertical supporting element comprises one of a pipe, a profile, and a support.

21. The arrangement according to claim 1, wherein the machine supports comprise two vertical supporting elements.

22. The arrangement according to claim 21, wherein the machine has a machine frame, and the two vertical supporting elements are attached to the machine frame.

23. The arrangement according to claim 21, wherein the supports further include two horizontal holding elements.

24. The arrangement according to claim 23, wherein the two horizontal holding elements each have an end region attached respectively to the two vertical supporting elements.

25. The arrangement according to claim 1, wherein the casing elements are doors.

26. The arrangement according to claim 1, wherein the casing elements are flaps.

27. The arrangement according to claim 1 forming a combination with a spinning preparation machine frame, wherein the casing elements comprise doors and further including a fulcrum located in at least one of a lower region and an upper region of the machine frame about which the doors are pivotable.

28. The arrangement according to claim 1, further comprising spring loaded latch bolts for mounting the casing elements.

29. An arrangement for a spinning preparation machine having machine sides presenting at least one side region of the machine, the arrangement comprising:
at least one vertical supporting element for supporting the machine;
at least one horizontal holding element for supporting the machine, the at least one horizontal holding element having a rail attached thereto; and
a machine casing arranged along the sides of the machine and including at least one casing element attached to the rail of the at least one horizontal holding element, the at least one casing element being displaceable along the rail in a horizontal direction to open up or close off openings in the machine casing so that free access is given to the at least one side region of the machine.

30. The arrangement as set forth in claim 29, wherein the machine sides further present at least one end region of the machine so that free access is given to the at least one end region of the machine.

31. An arrangement for a spinning preparation machine having machine sides presenting at least one side region of the machine, the arrangement comprising:
machine supports for supporting the machine, the machine supports including
at least one vertical supporting element; and
at least one horizontal holding element; and
a machine casing arranged along the sides of the machine and including at least one casing element attached to at least one of the at least one vertical supporting element or the at least one horizontal holding element, the at least one casing element being rotatable or pivotable around a vertical axis to open up or close off openings in the machine casing so that free access is given to the at least one side region of the machine.

32. The arrangement as set forth in claim 31, wherein the machine sides further present at least one end region of the machine so that free access is given to the at least one end region of the machine.

* * * * *